July 27, 1965 C. W. CLARK 3,197,211

SOUND RECORDING AND REPRODUCING APPARATUS

Filed March 26, 1962 5 Sheets-Sheet 1

INVENTOR
CHARLES W CLARK

BY
Watson, Cole, Grindle & Watson
ATTORNEYS

INVENTOR
CHARLES W. CLARK
BY
Watson, Cole, Grindle & Watson
ATTORNEYS

July 27, 1965 C. W. CLARK 3,197,211

SOUND RECORDING AND REPRODUCING APPARATUS

Filed March 26, 1962 5 Sheets-Sheet 3

INVENTOR
CHARLES W. CLARK

BY
Watson, Cole, Grindle & Watson
ATTORNEYS

July 27, 1965 C. W. CLARK 3,197,211

SOUND RECORDING AND REPRODUCING APPARATUS

Filed March 26, 1962 5 Sheets-Sheet 4

INVENTOR
CHARLES W. CLARK

BY Watson, Cole, Grindle & Watson
ATTORNEYS

SOUND RECORDING AND REPRODUCING APPARATUS

Filed March 26, 1962 5 Sheets-Sheet 5

INVENTOR
CHARLES W. CLARK
BY
Watson, Cole, Grindle & Watson
ATTORNEYS

United States Patent Office 3,197,211
Patented July 27, 1965

1 2

3,197,211
SOUND RECORDING AND REPRODUCING APPARATUS

Charles William Clark, 24 Manchester Square, London, England
Filed Mar. 26, 1962, Ser. No. 182,264
7 Claims. (Cl. 274—10)

Figure 1:
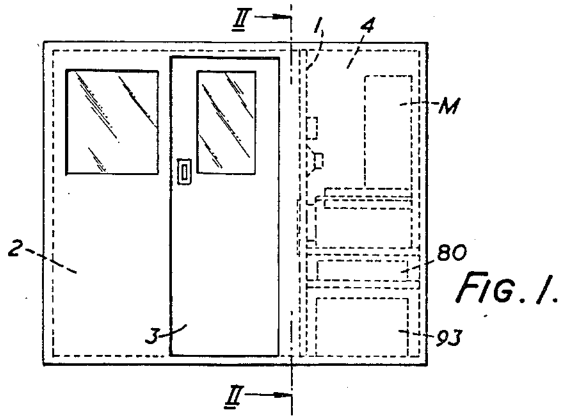

The present invention relates to sound recording and reproducing apparatus of the kind in which a sound record is produced in the form of a spiral groove in the surface of a disc which is rotated on a rotatable support (hereinafter called a turntable) during recording and reproduction.

In such recording apparatus, the sound groove is formed by a stylus constituting part of a recording head, which recording head is usually not directly responsive to sound to form the sound groove but is arranged to be responsive to electric signals received from a microphone and amplified before delivery to the recording head. The term "recording head" as used hereinafter is used to denote a recording head of such a kind.

Moreover, in such reproducing apparatus is included a pickup head including a stylus which is caused to traverse the length of the spiral groove in a record disc and means for transmitting electric signals in accordance with movements of the stylus through amplifying apparatus to a loudspeaker or other device which converts the electric signals into sound. The term "pick-up head" as used hereinafter is used to denote a pick-up head of such a kind.

According to the invention, sound recording and reproducing apparatus includes a motor driven turntable, a recording head and a pick-up head arranged for simultaneous movement towards and away from the rotational axis of the turntable, means for moving the heads laterally towards such a rotational axis and control means arranged to control the positions of the recording and pick-up heads independently relative to the turntable such that for an initial part of such lateral movement, the recording head is in an operative position to form a sound groove in the surface of a disc on the disc support, and for a subsequent part of such movement the pick-up head is in an operative position to traverse the length of the sound groove formed during the initial part of such movement.

In one form of the invention, the stylus of the recording head is arranged to form the sound groove by deformation of a surface portion of the disc without removal of material therefrom. Thus, during recording, no dust or swarf is formed which might be such as to interfere with the formation of the sound groove in the disc or with the operation of the apparatus, or which might be such as to create, for example, a fire risk if the recording is taking place within a confined space.

In such a form, the tip of the stylus is preferably of smooth conical form and made of sapphire or diamond. Preferably also the tip has an included angle of approximately 80° and the stylus is arranged so that when in engagement with the surface of the disc upon which a record groove is to be formed, the axis of the conical tip of the stylus lies at a trailing angle and is inwardly inclined towards the rotational axis of the turntable at an angle of between 10 and 15°. The trailing angle is conveniently about 20°, that is to say the axis of the conical tip lies at an angle of 20° with respect to the perpendicular to the disc surface at the point of contact of the stylus therewith, and lies to that side of the perpendicular towards which the rotating surface of the disc approaches.

It is of advantage to have the stylus arranged in this manner since it has been found that when so arranged the material of the disc surface displaced by the stylus during formation of the sound groove tends to be displaced laterally towards the inner edge of the sound groove and thus tends to form a ridge or buttress along such edge. Such a buttress has the advantage that it reduces the tendency of the stylus of the pick-up head to "rid up" out of the spiral groove and slip radially inwards towards the rotational axis of the disc when the sound recording is being reproduced. A record having such a buttress can therefore be used with poor, low quality sound reproducing apparatus.

The buttress may be .001 to .002" in height and the sound groove have a depth measured from the surface of the disc of about .001 to .004".

Conveniently the two heads are mounted upon a common carriage which, during both the initial and subsequent parts of said lateral movement, is driven to cause movement of the heads towards the rotational axis at a speed proportional to the speed of rotation of the disc support, and which, during a part of its movement prior to said subsequent part and immediately following said initial part and when the stylus of the recording head is in an operative position to form a groove in the disc surface, is driven at a higher speed than that during said initial and subsequent parts. Thus prior to the period when the pick-up head comes into engagement with the sound groove, the increased rate of movement of the carriage is such as to cause a "run out" groove of increased "pitch" to be formed in the surface of the disc.

The means for driving the carriage may comprise transmission mechanism including a unidirectional driving device (such as a free wheel mechanism) by which the carriage is driven from the turntable drive during the initial and subsequent parts of its lateral movement. If such a free wheel device is used an auxiliary motor may conveniently be included connected to that portion of the free wheel device coupled to and adjacent to the carriage to drive that portion at a higher speed during the intermediate part of the lateral movement of the carriage.

The carriage may, if desired, carry electric motors forming part of the control means which are coupled to drive individual cams to bring the respective heads into and out of engagement with the surface of the disc on actuation of associated electric switches by, for example, movement of the carriage during its travel. Preferably, however, the recording head is mounted upon the carriage and the carriage pivotally supported about an axis parallel with the surface of the disc. The control means may then include a cam driven by an electric motor carried upon a fixed support adjacent to the cam, and the cam be arranged to engage the carriage to pivot it about its axis to lower and raise the recording head and so bring the recording head into and out of engagement with the disc surface.

Conveniently the pick-up head is mounted upon an arm pivotable under the control of the control means about a pivot on the carriage to bring the pick-up head into and out of engagement with the disc. The pick-up head may be held spaced from the plane of the surface of the disc during said initial part of the movement by a stop included in said control means which, at the beginning of the subsequent movement, becomes ineffective to hold the pick-up head out of engagement with the disc surface and the sound groove formed therein.

In a preferred arrangement, the apparatus is housed in a compartment of a portable booth, cabinet or the like, the booth having a further compartment of sufficient size to accommodate a member of the public who might wish to make a recording.

Apparatus for use in such a booth preferably includes storage means for storing a plurality of blank record discs, a microphone and a sound reproducing device arranged respectively to transmit signals to the recording head and receive signals from the pick-up head, and coin released control means having mechanism for positioning discs from the storage means in turn upon the disc support and removing each disc from the disc support after the recording of sound thereon and the subsequent reproduction of the sound recorded, the control means being automatically effective upon the insertion therein of a coin to inaugurate rotation of the disc support and initiate movement of the coupled recording and pick-up heads, whereby sound received in the microphone during initial part of the movement of the heads is recorded upon a disc, and then reproduced in the sound reproducing device and the mechanism automatically actuated to remove the disc after reproduction of the recorded sound and deliver the disc to a delivery point while simultaneously positioning a blank disc upon the disc support and returning the heads to the position occupied by them prior to their movement towards the axis of rotation of the disc support.

If desired, operation of the apparatus may be inaugurated by mechanism other than coin release mechanism, the apparatus being arranged to be set in operation, or be made ready for operation, upon receipt of a token which may, for example, consist of the record disc upon which the recording is to be made.

The wall dividing such a booth into the two compartments is conveniently used as a support for the microphone and loudspeaker and also have located in it a slot into which the token required for inaugurating operation of the apparatus is inserted. Various indicators such as coloured bulbs and so on may be included on the partition to indicate to the occupant of the booth what is taking place at any given moment in the sequence of the operation of the apparatus as also an indicator to indicate during times when sound recording is taking place, the amount of time remaining for sound recording once recording has begun.

The term "blank record disc" is meant to refer to a disc having at least a part of one side thereof blank so that a sound recording can be formed in that part by the recording head. Thus, for example, such a term includes a record disc on one side of which has been formed by a suitable method prior to its use in the sound recording and reproducing apparatus of the invention, a sound record of, for example, a popular song or vocal advertisement for consumer goods, the other side being blank so that the user of the apparatus can have made upon it a record of songs received by the microphone. The term also includes a recording disc having a sound recording previously formed on both sides, one of the sides, however, being blank, for example, in a peripheral annular part surrounding a central area in which a sound recording has previously been formed.

Blank record discs are preferably formed of synthetic plastic material and may have printed matter imposed thereon in either or both sides.

Figure 2:
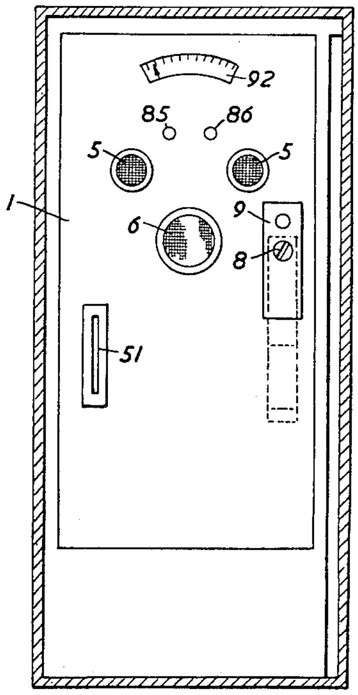
Figure 3:
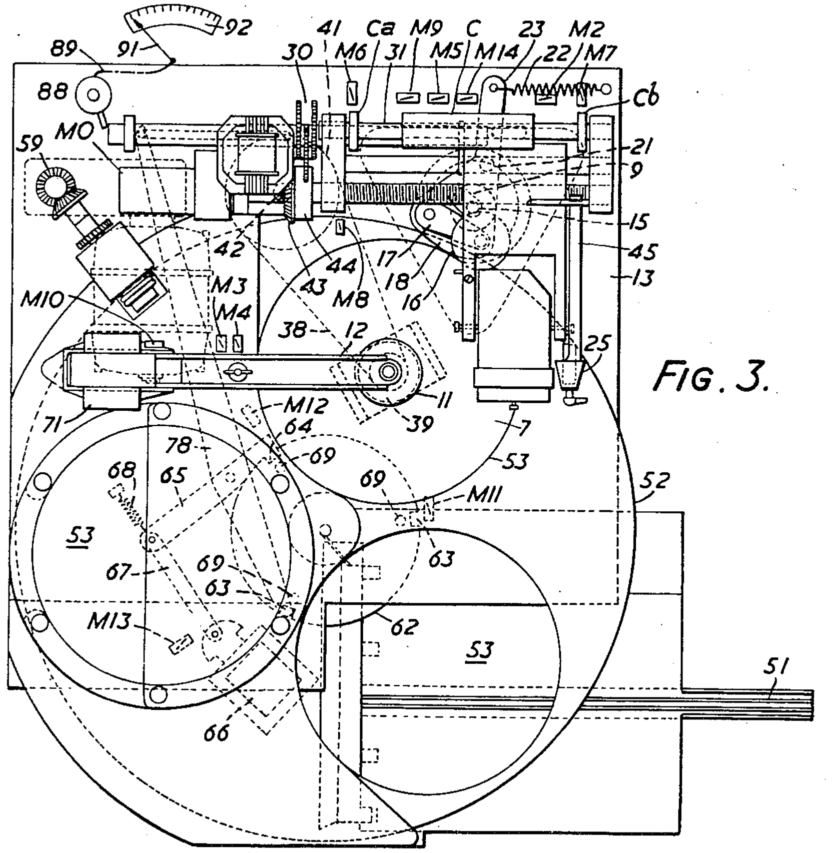
Figure 7:
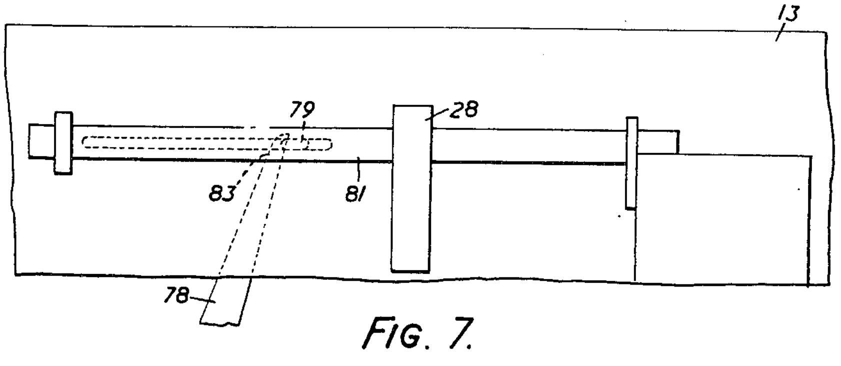
Figure 4:
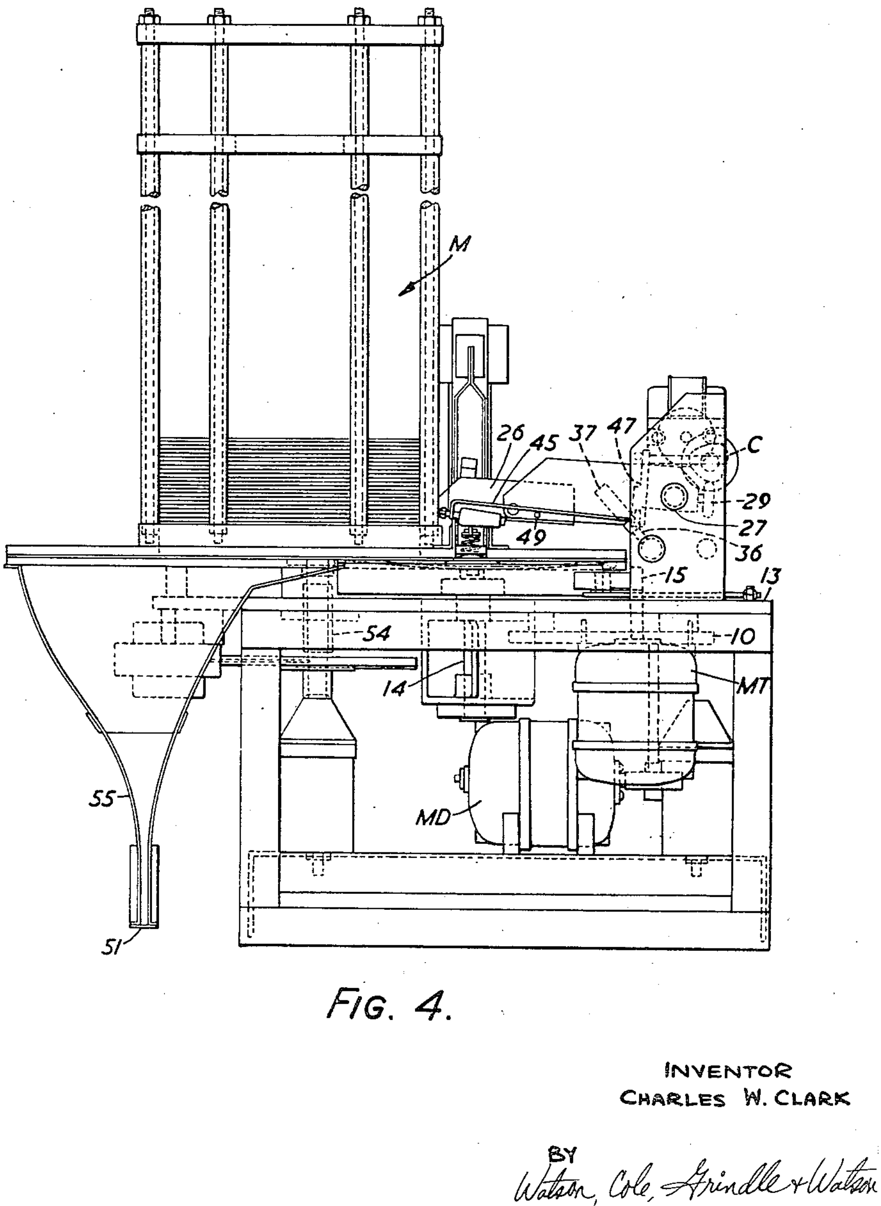
Figure 5:
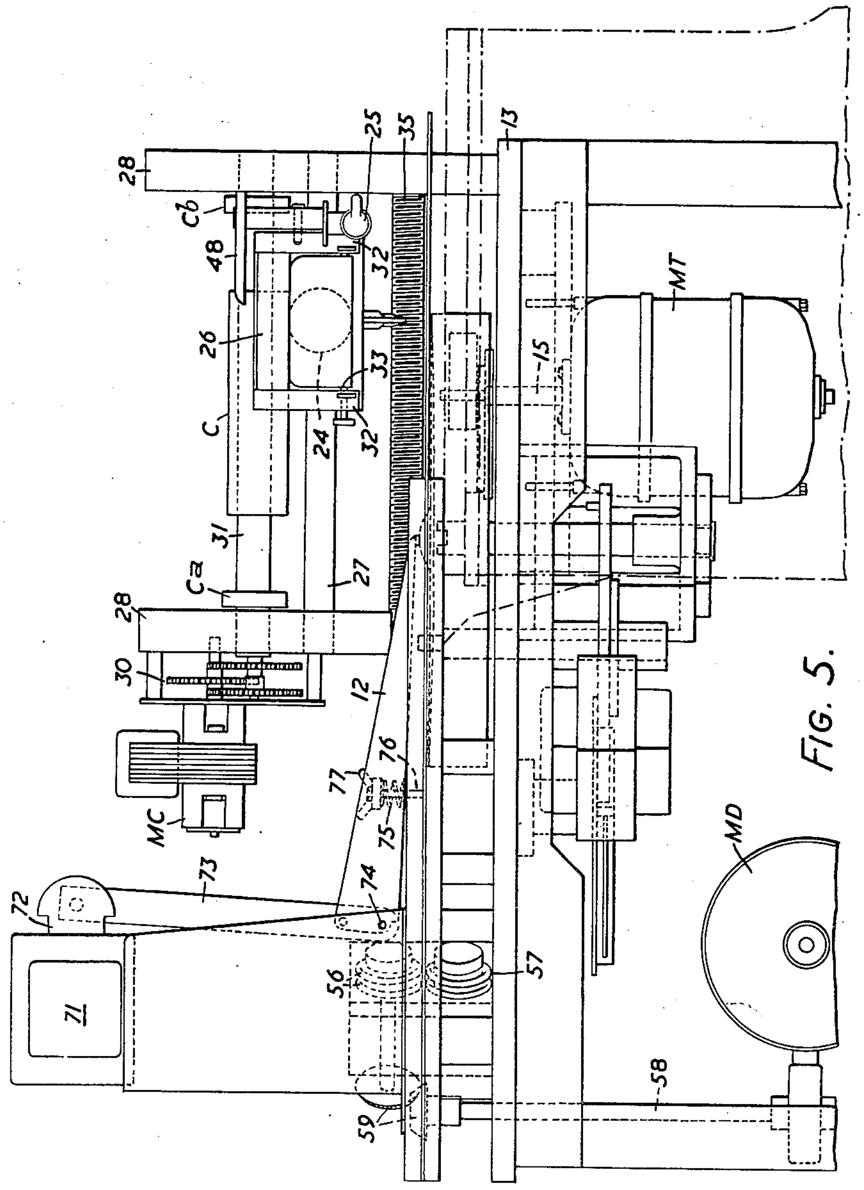
Figure 6:
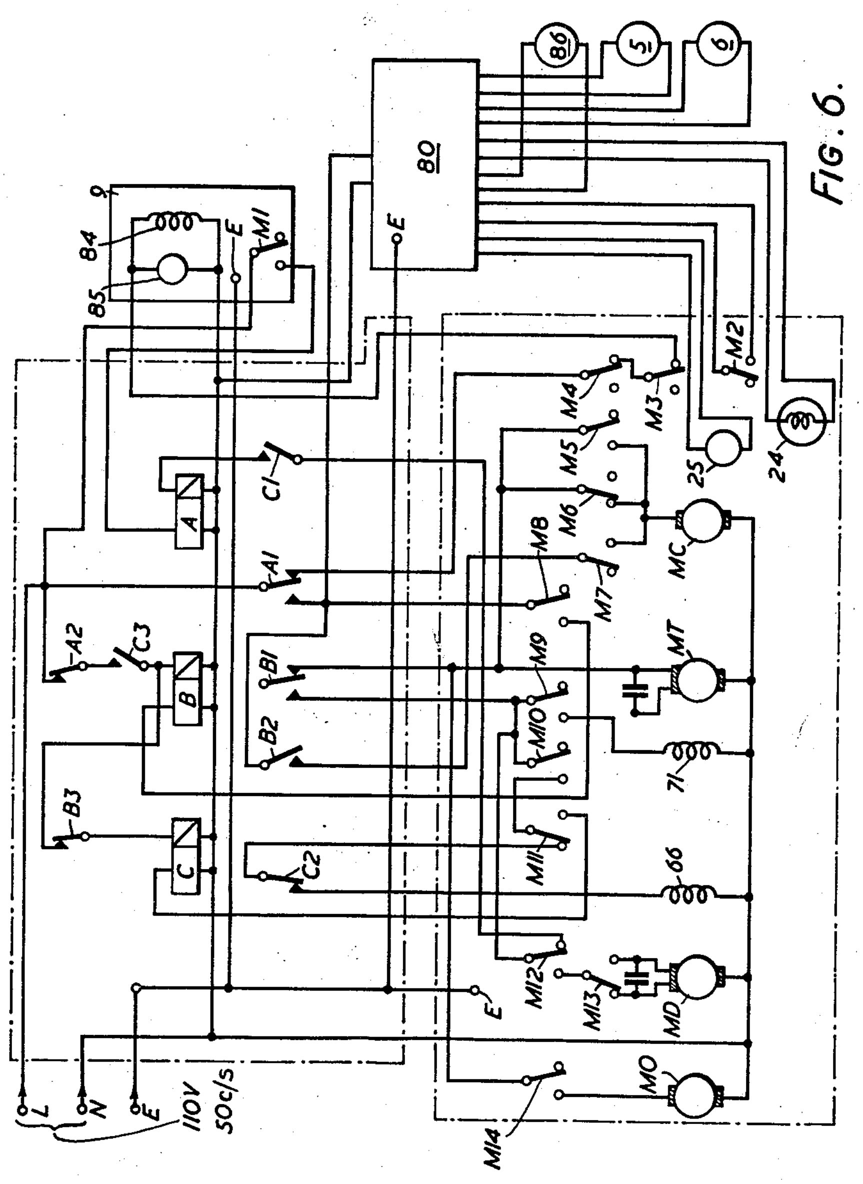

The invention may be put into practice in various ways and one embodiment thereof will now be described by way of example only with reference to the accompanying drawings in which:

FIGURE 1 is an elevation of a booth housing sound recording and reproducing apparatus for use by members of the public, FIGURE 2 is a view of a partition dividing the booth into two compartments, as seen by an occupant of one of the compartments making a recording, FIGURES 3, 4 and 5 respectively show the plan, and the front and side elevations of the sound recording and reproducing apparatus housed in the booth, FIGURE 6 is a circuit diagram of the control means incorporated in the apparatus of FIGURES 3, 4 and 5, and FIGURE 7 shows a detail of carriage return mechanism included in the apparatus.

In the illustrated embodiment a portable booth (shown in FIGURE 1) is divided by a partition 1 into two compartments, one 2 of which (the larger of the two) has an entry door 3 and is capable of accommodating a human occupant. The other compartment 4 houses sound receiving and reproducing apparatus including a pair of microphones 5 (FIGURE 2) and a loud speaker 6 which are supported in the partition 1, respectively to receive sound from and generate sound in the larger compartment.

The sound recording and reproducing apparatus includes a power driven turntable 7 (FIGURES 3, 4, and 5) arranged for rotation about a vertical axis by an electric motor MT. Energization of the motor is controlled by automatic control means which is set in operation by the closing of a switch MI (FIGURE 5) on insertion of a coin of specified value into the receiving opening or slot 8 (FIGURE 2) of a coin box 9 (FIGURE 2) supported by the partition. Upon the turntable 7 is a blank record disc previously positioned thereon after delivery from a pile of blank discs on a storage magazine M by a delivery mechanism described below. The disc is clamped upon the table by a freely rotatable clamping head 11 pressed against the centre of the record disc by a clamp arm 12 to thrust the record disc firmly against the upper surface of the turntable. In order to help secure the disc in position, the upper surface of the turntable is of rubber and is slightly dished so that the pressure of the clamping head causes the record disc to be depressed somewhat at its centre.

The turntable 7, which is supported above a horizontal platform 13 upon a vertical spindle, is driven from the drive output shaft 15 of the motor MT (which is mounted upon a plate 10 secured to the under side of the platform) by a rubber shod driving wheel 16 rotatably mounted about a vertical axis at one end of a trailing horizontal arm 17. The arm 17 is pivotally carried at its other end by a horizontal plate 18 which lies between it and the platform. The driving wheel 16 is in frictional contact both with the periphery of the turntable 7 and with a circumferential portion of the driving shaft 15 which projects upwards from the motor MT through platform and through an arcuate slot 19 in the plate 18. The slot is curved about a vertical axis 21 around which the plate is mounted to pivot and this axis 21 and the axes of rotation of the turntable and driving shaft of the motor MT are arranged in a common vertical plane, the axis 21 being located between the other two. The arm 17 is arranged to extend substantially at right angles to the said plane with the driving wheel so positioned that when transmitting drive between the driving shaft and the turntable, its rotation tends to move it into close contact with the said turntable and shaft. A spring 22 is secured between the plaftorm and an extending arm 23 of the plate to ensure that during periods when the motor MT is stopped, the driving wheel remains in contact with the turntable and the drive shaft.

A recording head 24 and a pickup head 25 are together mounted upon a carriage 26 which is arranged for lateral movement such as to cause the stylii of the respective heads to move along a radial path towards the axis of rotation of the turntable. The carriage 26 is mounted for sliding along the length of a horizontal guide rod 27 arranged in parallel with the said radial path and supported at each end by support blocks 28 mounted upon the upper surface of the platform 13. The carriage 26 is also arranged for pivotal movement about the guide rod 27 under the control of a cam C which is rotatable to bring the carriage into one or the other of three positions namely, a position in which the carriage is held in a lifted position with the stylus of the recordng head held clear of the record disc, a lowered position with the stylus of the recording head engaging the surface of the record disc, and a "half-lifted" position intermediate the other two. A roller 29 at the rear of the carriage, that is to say, at the end of the carriage which is remote from the turntable, acts as a bearing between the carriage and the cam surface.

The cam C comprises a solid cylindrical body coaxially mounted and centrally position upon a cam support rod 31 parallel with the guide rod 27 and rotatably mounted at each end in bearings in the support blocks 28. The cam is formed with three longitudinal faces of such width that during the whole of the lateral movement of the carriage along the guide rod any rotation of the cam (which is rotated by an electric motor MC coupled to drive it through reduction gearing 30, as described more fully hereinafter) causes the carriage to pivot about the guide rod to raise or lower the forward end of the carriage. The front of the carriage carries two integral forwardly extending parallel arms 32 supporting a horizontal rod 33 upon which a recording head is adjustably mounted. The recording head is, of course, so positioned upon the carriage that when the carriage is lowered the recording head stylus engages the surface of a disc upon the turntable to form a sound groove therein.

Drive is transmitted to the carriage to move it along the lengh of the guide rod 27 by mechanism including a lead screw 35 which lies parallel with the guide rod. The lead screw is rotatably supported at each end in the support blocks 28 and is engaged by a follower 36 carried in a mounting 37 secured to an under part of the carriage. The follower extends from beneath the carriage towards the rear thereof at an angle of approximately 45° to the length of the carriage and is resiliently urged outwardly of the mounting so as to engage the lead screw 35 and so impart movement to the carriage along the guide rod not only when the recording head stylus is in engagement with the disc surface to form a sound groove therein but also through a range of movement of the head away from the disc surface. Thus the carriage can be pivoted for some distance about the guide rod by the cam C to bring the recording head stylus away from the disc surface and into the "half lifted" position without loss of the driving connection between the follower and the lead screw. When however the cam C lifts the carriage to its fully-raised position, the connection between the lead screw and follower is broken.

Power to drive the lead screw is transmitted thereto by a belt drive 38 which is located below the platform and coupled between a pulley wheel 39 secured to the turntable spindle to rotate with it and a pulley wheel 41 carried upon a vertical shaft mounted in a bearing in the platform. The upper end of the vertical shaft carries a bevel pinion 42 which engages a bevel wheel 43 coupled to an end of the lead screw through a unidirectional driving device comprising a free-wheeled mechanism 44.

The portion of the free-wheel device next adjacent the lead screw is also coupled to be driven by the output shaft of an auxiliary "over-drive" motor MO, the arrangement being such that on energisation of the motor during the sequence of operation of the apparatus (as explained hereinafter) the lead screw is rotated by the motor MO at a rate higher than that at which it is rotated through the belt drive 38. The recording head stylus, which at the time of energisation of the motor MO is in contact with the disc surface, is thus caused to form a "run out" groove in the disc. As explained below, after formation of the "run out" groove during part (the intermediate part) of the lateral movement of the carriage, a microswitch M14 opens to de-energise the motor and the lead screw becomes driven once more from the belt drive.

When the cam is being rotated by the cam index motor MC to bring the carriage into a desired position about the guide rod 27, the carriage is stopped when the desired position is reached by the opening of one or other of two micro-switches M6 and M7 operated by respective plate cams *Ca* and *Cb*. These cams are supported at opposite ends of the cam support rod 31 to rotate simultaneously with the cam C.

The cam *Ca* is formed with two "noses" angularly spaced in opposite directons from the position on the cam engaged by the follower of the switch M6 when the carriage is in the fully lifted position by 120°. The follower of the switch M6 (which switch is located behind the carriage adjacent the cam *Ca*) so engages the cam that the switch is held open when the follower is engaged by a nose of the cam but is closed at other times. The cam *Cb* is formed with a notch into which falls the follower of the switch M7 when 360° rotation of the cam has occurred to bring the carriage back to the fully lifted position from which it was lowered at the beginning of the cycle of operation of the apparatus. The switch M7, which is held closed at all other times, falls open when the follower drops into the notch.

The pick-up head 25 is supported at one end of an arm 45 which is freely pivotable about a pivot extending laterally from one side of the carriage. During the initial and intermediate parts of the lateral movement of the carriage an upstanding post 47 on the arm near the pivot engages a stop comprising a transverse cantilever 48 which projects from the right hand support block (as seen in FIGURE 3) above and towards the centre of the carriage.

As the carriage moves along the guide rod 7 the post 47 eventually slips off the end of the cantilever to lower the stylus of the recording head into contact with the disc surface and engage the sound groove. The length of the cantilever is such that the recording head engages the disc surface immediately after the run out groove is completed and the cam C acts to pivot the carriage at the end of the intermediate period to bring the recording head out of engagement with the disc and into the half-lifted position.

Lateral movement of the carriage then continues to allow "play back" of the sound recorded until, as it approaches the end of its travel along the guide rod, its movement closes a micro-switch M8 to cause the cam C to be rotated once more to pivot the carriage back into its fully lifted position (the cam at the same time lifting the pick-up head from the recording by reason of a laterally extending pin 49 on the side of the carriage which engages beneath the arm 45 carrying the pick-up head). When the carriage attains the fully lifted position it closes a micro-switch M9 and the apparatus is thereby actuated to release the recording from the turntable and deliver it to a delivery point comprising a slot 51 (FIGURE 2) formed in the panel from which the record can be removed by a person in the larger compartment 2 of the booth. During delivery of the recording to the slot a blank record disc from the magazine M is placed upon the turntable 7, the carriage is returned to its outer position in the guide rod 27 and the apparatus brought back into its original condition in readiness for the insertion of a new coin into the coin box to initiate the cycle of operation once again.

The removal of the recording from the turntable and its replacement by a blank record disc is effected by guide means (referred to herein as delivery mechanism) including a large-diameter, circular, horizontal delivery plate 52 having three circular apertures 53 cut in it of slightly larger diameter than that of the record discs. The apertures 53 are equi-angularly spaced about the centre of the plate 52 on a common pitch circle. The delivery plate is arranged for rotation in steps of 120° about a vertical shaft 54 which is so positioned that during rotation of the plate each aperture is brought, in turn, directly below the pile of blank record discs in the magazine to have the lowest disc in the pile drop into it, then brought into a position coaxial with and directly above the turntable to permit the disc within it to rest upon the turntable, and then brought into a position in which it overlies a chute 55 into which the record disc falls for delivery to the slot 51. Further rotation of the plate of course brings the aperture below the magazine once more to receive a further blank record disc.

Rotation of the delivery plate is effected by two rubber-shod, horizontal rollers 56, 57 arranged with their axes one above the other and radial of the delivery plate. The rollers engage the periphery of the delivery plate between them and are driven by a delivery plate motor MD located below the platform. The drive is transmitted from the motor MD to the rollers 56, 57 through shafting 58 and bevel gears 59.

To ensure that when not rotating the delivery plate is accurately located in each of its three angular positions, a circular plate 62 carried upon the delivery plate support shaft 54 below the platform 13 has three notches 63 formed in its periphery at 120° spacing. Each notch is engaged in turn by a spring loaded detent 64 carried at one end of a detent arm 65 pivotable about a vertical axis by a detent actuating solenoid 66 through a link 67. Thus for the delivery plate to rotate from one position to another, the detent is first disengaged from the notch in which it is located by actuation of the solenoid against a spring 68.

Secured upon the upper surface of the notched disc are three upstanding pins 69 each located beside a respective notch 63 for the purpose of actuating a micro-switch M11 supported on a fixed mounting adjacent the plate.

For rotation of the delivery plate the clamp arm 12 must, of course, be released from the record disc upon the turntable and this is effected by actuation of a clamp arm release solenoid 71 whose armature 72 is pivotally secured to the upper end of an upstanding post 73 rigidly fixed to the rear of the clamp arm, the clamp arm being pivotable about a horizontal bearing 74 adjacent the base of the post. Actuation of the solenoid causes movement of the armature to swing the clamp rod around the bearing to lift the clamping head 11 away from the recording disc and so release it.

When the solenoid 71 is de-energised, the clamping head 11 is brought into position upon the new disc by a downwardly acting spring 75 which bears against the upper surface of the clamp arm. The spring is concentrically arranged about a post 76 which is secured to the platform and passes thronugh an aperture formed in the arm, and the compression of the spring can be varied by movement of the position of an adjustable nut 77 threaded upon its upper end. Micro-switches M3 and M4 incorporated in the control means and actuated by movement of the clamp arm act as explained hereinafter to prevent operation of the apparatus if no disc lies upon the turntable or if the disc is not properly positioned thereon. Micro-switches M5 and M9 incorporated in the control means are actuable by movement of control surfaces upon the rear of the carriage, as is also a micro-switch M12 actuated on movement of the detent 69.

Return of the carriage to its initial outer position in the guide rod 27, ready once more for lateral movement on re-initiation of the cycle of operation, is effected by a horizontal carriage return lever 78 which is actuated by movement of an appropriate one of the pins 69 carried by the notched disc 62. The lever 78 engages a post 79 on the far end of a thrust rod 81 carried by an extending laterally from the carriage (as shown in FIGURE 6) to push the rod, and therefore the carriage, back to its original position. The post 79 projects downwards through a slot 82 in the platform and is engaged by the tip 83 of the lever 78.

The control means of the apparatus includes electric circuitry which, in addition to the motor and switches referred to above, includes the amplifier 80 and three latch-relays A, B and C. A cycle of operation of the control means and its associated circuitry will now be described with reference to the circuit diagram of the control means shown in FIGURE 6. Relay A, which is a two-contact relay, and relays B and C, which have three contacts each, are mounted upon a relay panel (not shown) secured to a wall of the smaller compartment of the booth.

During recording the amplifier 80 amplifies signals generated in a microphone prior to their delivery to the recording head and at other times is responsive to receive signals from the pick-up head to amplify them before they are delivered to the loud speaker. During amplification of the signals from the pick-up head only the later stages of the amplifier are used (the amplifier being then in the low power mode) since the amplification required during "play back" is less than that required during recording. Thus, when recording, all stages of the amplifier are used and the amplifier is then in high power mode.

The control circuit of the amplifier is connected to receive power from a power supply source of 110 volts at 50 cycles per second through a contact A1 of the relay A. The arrangement is such that for power to be delivered to the control circuit and the amplifier the relay A must first be actuated and this is achieved by the closing of the switch M1 on insertion of a coin into the coin box 9 (switch M1 being connected between the supply and the energising coil of the relay A). Movement of the contact A1 is arranged to break a connection between the supply and a green bulb 85 (FIGURES 2 and 5) on the partition 1, and de-energise a solenoid 84 which, when energised, draws slot closure bar (not shown) away from the slot to permit entry of a coin.

Entry of the coin into the coin box thus actuates the relay A to cause the solenoid 84 to be de-energised and the slot closure bar to close the slot, and the green bulb 85 (FIGURES 2 and 5) in the partition to be switched off and the amplifier 80 to be energised.

Actuation of the contact A1 also energises both the motor MT to rotate the turntable, and the cam index motor MC to rotate the carriage actuating cam C. The rotation of the cam C causes the carriage to be lowered to bring its follower 36 into contact with the lead screw 35 now being driven from the turntable motor via the belt drive 38.

When the cam C has rotated through 120° it opens the switch M6 to switch off the cam index motor MT, the recording head then being in contact with a disc clamped on the turntable by the clamping head 11 on the clamping arm 12.

After a few "run-in" grooves have been formed in the disc surface, the carriage, in its travel under the action of the lead screw, actuates the switch M2 to cause signals corresponding with sounds occurring in the booth to be delivered from the microphone to the amplifier (then in the high power mode), the amplified signal then being transmitted to the recording head which forms a corresponding sound groove in the disc surface. That sound is being recorded is signified by the energising of a red recording light 86 in the panel.

After expiry of the fixed recording period the lateral movement of the carriage causes the switch M2 to open and the amplifier to return to the low power mode.

On or immediatly after switch M2 opens, the carriage movement closes the switch M14 to energise the overdrive motor MO which rotates the lead-screw at an increased speed to cause overrunning of the free wheel device and the formation of a "run out" groove in the central part of the record disc.

At the end of the run out groove, movement of the carriage allows the switch M14 to swing open to switch off the overdrive motor and at the same time closes switch M5 to energise the cam index motor MT to lift the carriage 26 under the action of cam C and bring the recording head away from the disc. The lifting of the carriage causes switch M5 to fall open once more but since cam *Ca* is also being rotated with cam C, switch M6 falls shut to allow the cam index motor MT to continue to run until, after 120° of rotation of the cams, the second nose of the cam *Ca* opens the switch M6 to stop the motor MT with the carriage in the "half-lifted" position with the follower still engaged with the lead-screw At this position of the carriage in its travel along the lead-screw, the pick-up arm, which has been held up by reason of the upstanding post 47 at its rear end engaging the cantilever 48, becomes free of the cantilever and moves into gravity to bring the pick-up head stylus into engagement with the record surface. As the carriage continues to move along the guide rod such sounds as were recorded in the record during the recording period, after amplification of the signals generated in the pick-up head by the later stages of the amplifier, are then generated by the loud speaker.

At the end of the "play back" period, when movement of the carriage has been such as to bring the pick-up head to the run-out groove, the carriage operates switch M8 to actuate the latch relay B and shift its three contacts B1, B2 and B3. Shifting of the contact B1, through which the power to the turntable motor MT is transmitted, de-energises the turntable motor and simultaneously cuts the supply connection to switches M5 and M6 through one of which the cam index motor MC has hitherto been driven. However, contact B2 having been shifted, the cam index motor MC is now energised through switch M7, which since the initial movement of the cam C to lower the carriage, has been held closed by cam C*b*. Thus movement of the cam index motor continues and through the agency of the cam C the carriage is lifted into its fully raised position, the cams N1, N1*a* and N1*b* then being returned to their original starting position. The cam index motor MC is stopped by switch M7 falling open when the follower actuating the contact arm of the switch reaches the notch in the cam surface of the cam C*b*.

When the carriage reaches its fully lifted position it closes the switch M9 by pressing against the actuating arm of the switch. The contact of the switch M9, as also the contacts of switches M10 and M12, has been connected to supply through the contact B1. The closing of switch M9 energises the clamp arm actuating solenoid 71 to lift the clamp arm and release the record disc. When fully "up" the clamp arm closes a switch M10 secured to a fixed support adjacent the arm to energise the detent actuating solenoid 66 via the closed switch M11, which is held closed (as illustrated) during recording and playback by one of the pins 69 on the notched plate 62. The closing of switch M10 also energises a contact C2 of the latch relay C, which contact is held closed when the relay C in unenergised.

The detent actuating solenoid 66, when energised, actuates the link 67 carrying the detent 64 engaging one of the three notches 63 in the notched plate to bring the detent out of engagement and actuate switch M12 which connects the supply through a switch M13 to the delivery plate motor MD, which then drives, the double rubber-shod rollers 56, 57 which engage the edge of the delivery plate between them. Rotation of the delivery plate 52 "sweeps" the disc upon which a recording has been made into a delivery chute 55 leading to the delivery slot 51 from which the record can be removed by the person in the booth.

Rotation of the delivery plate also brings a new, blank disc from the magazine into position on the turntable and at the same time turns the notched plate 62 to release the switch M11 and so connect the supply received by the switch (via the closed switch M10 and contacts A1 and B1) to energise the latch relay C3 and so actuate its three contacts. The changeover of switch M11 also de-energises the detent actuating solenoid 66 to release the detent 64 (which cannot fall back into the notch as the notch has now moved on) to ride on the curved periphery on the notched disc 62. To ensure that the detent actuating solenoid cannot be re-operated (by the next pin on the plate closing the switch M11) to hold the detent out of the notch reached when the plate 62 has turned through 120° a contact C2 of the relay C breaks when the relay C is energised to cut off the connection between the switch M11 and the detent actuating solenoid 66.

Thus the detent falls into the next notch and the associated link 67 is arranged to trip the switch M13 (located below the platform adjacent the link 67) which changes the supply connection to the delivery disc motor MD in such a manner as to tend to reverse the direction of the motor and so provide a heavy braking torque upon the rotating delivery disc. Immediately after the tripping of the switch M13 when the detent falls into the slot, the switch M12 (originally operated when the detent was moved out of its slot) is released to cut off the supply to the delivery disc motor MD and the disc is thus stopped "dead," the recording by then, having been delivered into the chute 55 and a blank disc brought into position upon the turntable.

Switch M12 moreover, on disconnecting the supply from the delivery disc motor MD connects the supply instead to the unlatching coil of the relay A via a contact C1 which was closed on actuation of the latch relay C.

The relay A thus returns to its un-energised position to allow contact A1 to open and so cut off the supply to the amplifier and to the switches (thus stopping rotation of the turntable motor and de-energising the clamp arm solenoid 71 to allow the clamp arm to fall back and clamp the new disc in position). Thus, it can be seen that everything is in position for a start to another cycle of operation, when the carriage is returned to its original position and once release of the latch relays B and C has been attained.

This latter occurs on the return of relay A to the unenergised position since the unlatching coils of the relays B and C are connected in parallel through a common contact C3 closed on energisation of the relay C and a contact A2 which is held open on energisation of relay A. The connection to the unlatching coil of relay C is taken through a contact B3 held open on energisation of the relay B.

When relay A is unlatched, therefore, contact A2 returns to the closed position to connect the supply through contact C3 to unlatch the relay B and so cause the contact B3 to shut. The shutting of contact B3 then connects the supply to the unlatching coil of relay C which in turn opens a contact C3 and so disconnects the supply from the unlatching coils ready for the next cycle of operation.

It will be understood that when the contact A1 moves over to disconnect the amplifier, the switches and the motors MT and MC from the supply, the contact A1 returns to the position in which the green bulb 85 is lit to signify that the apparatus is ready for further operation and the solenoid 84 energised to draw back the slot closure bar to permit entry of a further coin into the coin box for initiating a further cycle of operation.

Recycling is prevented, however, if for any reason no disc has been positioned upon the turntable or the disc on the turntable is asked by reason of either the switch M4 or the switch M3 being held open by the clamp arm, the two switches being connected in series in the power supply line to the green light and the solenoid actuating the slot closure bar. If no record is on the turntable the clamp arm takes up a position lower than that when a disc is properly in place to allow switch M4 to fall open, while if the disc is askew, the clamp arm is held up in a "high" position to hold switch M3 open. Thus the green light cannot be energised nor the slot closure bar drawn back to open the slot.

The carriage is returned to its starting position during rotation of the disc delivery plate by the horizontal carriage return lever which is engaged at one end by one of the three pins on the notched plate to be rotated about a vertical pivot 87 and engage with its other end the post 79 extending downwards through the slot 82 in the platform from the thrust rod 81. Thus when the lever is rotated the carriage is pushed back to its starting position.

The thrust rod during its lateral movement when recording is taking place is arranged to rotate a capstan 88 (FIGURE 3) about which is wound a wire cable 89 connected to move an indicator needle 91 across a scale 92 (FIGURE 2) visible by the person making a recording to signify the amount of recording time which has lapsed since the start of recording upon the disc.

Temperature control apparatus 93 (FIGURE 2) is included in the compartment in which the apparatus is housed to maintain the temperature therein at or near the optimum temperature required for proper formation of the sound groove in the material of which the record disc is composed.

What I claim as my invention and desire to secure by Letters Patent is:

1. Sound recording and reproducing apparatus including a base structure, a turn-table constituting a disc support rotatably mounted on said base, a first motor, means operatively connecting the motor and turn-table to rotate said turn-table about its axis, a carriage slidably mounted on said base structure for movement along a path above and substantially parallel to the plane of said turn-table, said carriage being pivotal about an axis substantially parallel to the plane of said turn-table, traversing means driven by said first motor and operatively connected to said carriage to control the movement of said carriage towards said axis of rotation along said path, a recording head including a recording stylus mounted on said carriage, an arm pivotally mounted at one end to said carriage, a pick-up head including a pick-up stylus secured to the end of said arm opposite said pivotal mounting, said recording head being situated nearer than said pick-up head to the axis of rotation of said turn-table, first transducer means connected to said recording head for converting sound waves into electrical pulses and transmitting them to said recording head, second transducer means connected to said pick-up head for receiving electrical pulses from said pick-up head and converting them to sound waves, a second motor, means operatively connected to said carriage and driven by said second motor for rotating said carriage about its pivot, switch means connected to said second motor located at a plurality of positions along the path of said carriage and responsive to the movement of said carriage along said path to control the operation of said second motor whereby said recording stylus engages said disc only during the movement of said carriage along a first portion of said path, an elongated stationary stop means secured to said base parallel to said path and extending along only said first portion of said path, means secured to said pivoted arm for slidable engagement with said stop means whereby said pick-up stylus is retained out of engagement with said disc during the movement of said carriage along said first portion of said path, said pivoted arm being released to permit said pick-up stylus to engage said disc during the movement of said carriage along a subsequent portion of said path.

2. Apparatus as claimed in claim 1 in which said means operatively connected to said carriage and driven by said second motor for moving said carriage about its pivot comprises an elongated rotatable cam located parallel with said path for slidable engagement with said carriage.

3. Apparatus as claimed in claim 1 including starting means effective to initiate rotation of the disc support and the movement of the recording and pick-up heads to record sound upon the disc and subsequently reproduce the sound recorded conditionally upon receipt of a token by the starting means.

4. Apparatus as claimed in claim 3 in which the starting means is arranged to be actuated by the insertion of a coin.

5. Apparatus as claimed in claim 3 in which the starting means is arranged to be actuated by the insertion of a blank record disk and the apparatus includes guide means for causing the inserted disc to be located upon the turn-table.

6. Apparatus as claimed in claim 1 including storage means for storing a plurality of blank recording discs, and coin-released control means having a mechanism operative, while said carriage is returning to the position it occupied prior to its movement along said path, for positioning recording discs received in turn from said storage means upon the disc support and removing each disc from said disc support after the recording of sound thereon and the subsequent reproducing of the sound recorded, delivering said disc to a delivery point while simultaneously positioning another blank disc upon said disc support, the control means being automatically effective upon the insertion therein of a coin to initiate rotation of the disc support and initiate movement of the recording and pick-up heads, whereby sound received by said first transducer means during said movement of said carriage along said first portion of said path is recorded upon said disc and is then reproduced by said second transducing means during said movement of said carriage along said subsequent portion of said path, and then removing said disc.

7. Sound recording and reproducing apparatus as claimed in claim 1 wherein said traversing means moves said carriage towards the axis of rotation of said turntable at a normal speed proportional to the speed of rotation of said turn-table during the movement of said carriage along said first and subsequent portions of said path and which during the movement of said carriage along an intermediate portion of said path moves said carriage towards said axis of rotation at a speed higher than said normal speed.

References Cited by the Examiner

UNITED STATES PATENTS

| | | | |
|---|---|---|---|
| 2,130,158 | 9/38 | Rysick | 274—30 |
| 2,229,430 | 1/41 | Warner | 174—100.4 |
| 2,819,089 | 1/58 | Williams | 274—42 |
| 3,021,143 | 2/62 | Whitney | 274—20 |

LOUIS J. CAPOZI, *Primary Examiner.*

ANTONIO GUIDA, *Examiner.*